(12) United States Patent
Zhang et al.

(10) Patent No.: US 9,888,173 B2
(45) Date of Patent: Feb. 6, 2018

(54) ANNULAR VIEW FOR PANORAMA IMAGE

(71) Applicants: QUALCOMM INCORPORATED, San Diego, CA (US); Lei Zhang, San Diego, CA (US); Xuan Zou, San Diego, CA (US); Fan Ling, San Diego, CA (US)

(72) Inventors: Lei Zhang, San Diego, CA (US); Xuan Zou, San Diego, CA (US); Fan Ling, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 306 days.

(21) Appl. No.: 14/442,837

(22) PCT Filed: Dec. 6, 2012

(86) PCT No.: PCT/CN2012/001632
§ 371 (c)(1),
(2) Date: May 14, 2015

(87) PCT Pub. No.: WO2014/085948
PCT Pub. Date: Jun. 12, 2014

(65) Prior Publication Data
US 2015/0296141 A1    Oct. 15, 2015

(51) Int. Cl.
*H04N 5/232*    (2006.01)
*G06T 11/60*    (2006.01)
(Continued)

(52) U.S. Cl.
CPC ......... *H04N 5/23238* (2013.01); *G03B 37/02* (2013.01); *G06T 3/4038* (2013.01); *G06T 11/60* (2013.01); *H04N 5/23293* (2013.01)

(58) Field of Classification Search
None
See application file for complete search history.

(56) References Cited

U.S. PATENT DOCUMENTS

| | | | |
|---|---|---|---|
| 7,486,324 B2 * | 2/2009 | Driscoll, Jr. | ........... G02B 13/06 348/143 |
| 7,801,584 B2 | 9/2010 | Iddan et al. | |

(Continued)

FOREIGN PATENT DOCUMENTS

| | | |
|---|---|---|
| CN | 101211099 A | 7/2008 |
| CN | 202067505 U | 12/2011 |

(Continued)

OTHER PUBLICATIONS

Supplementary European Search Report—EP12889444—Search Authority—The Hague—Jun. 22, 2016.

(Continued)

*Primary Examiner* — Edemio Navas, Jr.
(74) *Attorney, Agent, or Firm* — Knobbe, Martens, Olson & Bear, LLP

(57) ABSTRACT

A device (300) for displaying panoramic images includes an image sensor (315), a panoramic display module (345) and a display (325). The display (110, 200) displays an annular panorama view (120, 210). The annular view (120, 210) may be an incomplete annulus for illustrating a missing view angle (126) from an incomplete panoramic image. The display (200) further includes a window (220) and a high resolution display portion (240). The window (220) bounds a portion (230) of the annular view (210). The high resolution display portion (240) displays a high resolution image corresponding to the portion (230) of the annular view (210). The window (220) is movable around the annular view (210). A size of the window (220) or the high resolution display portion (240) is adjustable. A method for generating a panoramic image is also provided.

19 Claims, 6 Drawing Sheets

(51) Int. Cl.
*G06T 3/40* (2006.01)
*G03B 37/02* (2006.01)

(56) References Cited

U.S. PATENT DOCUMENTS

| | | | |
|---|---|---|---|
| 2002/0046218 A1 | 4/2002 | Gilbert et al. | |
| 2007/0103543 A1* | 5/2007 | Anderson | H04N 5/2251 348/36 |
| 2008/0218587 A1* | 9/2008 | Glatt | G08B 13/1968 348/39 |
| 2011/0216179 A1* | 9/2011 | Dialameh | G06F 17/30247 348/62 |
| 2011/0234852 A1 | 9/2011 | Ishida | |
| 2012/0194636 A1 | 8/2012 | Tokunaga et al. | |
| 2013/0141524 A1* | 6/2013 | Karunamuni | G06T 3/4038 348/38 |

FOREIGN PATENT DOCUMENTS

| | | |
|---|---|---|
| EP | 2317423 A2 | 5/2011 |
| JP | 2004086848 A | 3/2004 |
| JP | 2004215228 A | 7/2004 |
| JP | 2005303594 A | 10/2005 |
| JP | 2006033353 A | 2/2006 |
| JP | 2008098754 A | 4/2008 |
| JP | 2010204773 A | 9/2010 |
| JP | 2011211267 A | 10/2011 |
| JP | 2012-029180 * 2/2012 | ............. H04N 5/225 |
| JP | 2012029180 A | 2/2012 |
| JP | 2012160904 A | 8/2012 |
| WO | WO-2009019699 A2 | 2/2009 |

OTHER PUBLICATIONS

Brown—AutoStitch: A New Dimension in Automatic Image Stitching printed on Aug. 9, 2012 from http://www.cs.bath.ac.uk/brown/autostitch/autostitch.html; 11 pages.

International Search Report and Written Opinion—PCT/CN2012/001632—ISA/EPO—Sep. 19, 2013.

Microsoft—Photo Gallery Printed on Aug. 9, 2012 from http://windows.microsoft.com/en-US/windows-live/photo-gallery-get-started; 1 page.

Wikipedia—"Image Stitching", Printed on Aug. 9, 2012 from http://en.wikipedia.org/wiki/Image_stitching; 3 pages.

* cited by examiner

ANNULAR VIEW FOR PANORAMA IMAGE

CROSS-REFERENCE TO RELATED APPLICATIONS

This application is a national stage application of International Application No. PCT/CN2012/001632, filed on Dec. 6, 2012, published in the English language.

TECHNICAL FIELD

The present embodiments relate to imaging devices, and in particular, to methods and apparatus for the display of annular views of panoramic images.

BACKGROUND

Digital imaging capabilities have been integrated into a wide range of devices, including digital cameras, tablet computers, and mobile phones. Digital imaging devices or image capture systems can refer to any device that can capture one or more digital images, including devices that capture still images or videos.

The integration of digital processing technology with imaging devices has enabled more powerful and easier to use photographic products, and has enabled compact devices to capture and enhance image data. For example, digital imaging devices may employ image stitching, which is the process of combining multiple photographic images with overlapping fields of view to produce a segmented panorama or high-resolution image. Commonly performed through the use of computer software, most approaches to image stitching require nearly exact overlaps between images and identical exposures to produce seamless results. Some digital imaging devices can stitch their photos internally, while some image stitching techniques are performed on a separate computing device.

Existing approaches implement display of panoramic images through a user interface which depicts the panorama as a view image in the shape of a rectangular unwrapped image of a cylindrical projection. There are two problems with such a way to display the panorama view. First, it is difficult to show the entire image on a relatively small UI, for example the screen of smart phone. The resulting image is usually very wide relative to its height, and the larger the range of the view angle covered by the panorama, the wider the resulting image will be. As a result, the details of the panoramic image are not large enough to be clear when the whole panorama is viewed. Therefore, such rectangular panorama views are not suitable to be displayed on the small screen of a smart phone or digital camera display screen.

Moreover, a rectangular panorama display may make it difficult for a user to determine whether additional photos are necessary. Even where the user has captured images for the whole 360 degrees of the panorama, most approaches to image stitching require nearly exact overlaps between images to produce seamless results. If edge features of the individual images of the panorama do not match exactly, or if there is not sufficient overlap, this may cause imperfections in the assembly of the panorama. Even small misalignments between images of the panorama can result in stitching difficulties known as "keystoning" which refers to images which, when stitched together, are not vertically aligned. This leads to a cropped panorama image which does not cover the full 360 degree view. It is often difficult to ascertain what view angle is not covered by the panorama when viewing a rectangular view.

SUMMARY

The annular view display techniques described herein occupy a compact region of a display screen and are therefore easier to show on a relatively small user interface, such as a mobile telephone. A further advantage is that the annular view image is able to indicate the range of view that the panoramic image covers. In some circumstances, image stitching techniques may generate an incomplete panorama and therefore a user may desire to capture additional image data to complete the view angle of the panorama. In such an instance, it is helpful for the user to be able to see what view angle is missing to capture an image of that view angle. Even when a full view angle is captured, it is beneficial to present a user with an annular view so that the details of the panorama are viewable on a small user interface.

Some of the present embodiments may include techniques for generating and displaying an annular view representation of a panorama to a user. Certain embodiments may include techniques for displaying an incomplete annulus to the user to indicate a missing view angle of the panorama. Other embodiments may include techniques for allowing the user to select and display a high resolution version of a portion of the panorama.

According to an embodiment, a system for displaying panoramic images comprises an image sensor configured to capture a panoramic image of a scene of interest, a panoramic display module configure to read the captured panoramic image and form an annular display output of the panoramic image, and a display configured to display the annular display output of the panoramic image. In certain embodiments, the image sensor may be configured to capture a plurality of images, wherein each image corresponds to a portion of the total panoramic view angle. The image sensor may configure the plurality of images as a panoramic image through image stitching techniques, or this step may be accomplished in some embodiments by a separate device.

The display of the image capture system may further comprise a window configured to bound a portion of the annular configuration and a high resolution display portion configured to display a rectangular image, wherein the rectangular image corresponds to the portion of the annular configuration. The window may be slidable around the annular panorama view, and in some embodiments may be of adjustable width.

DETAILED DESCRIPTION

Figure 1:
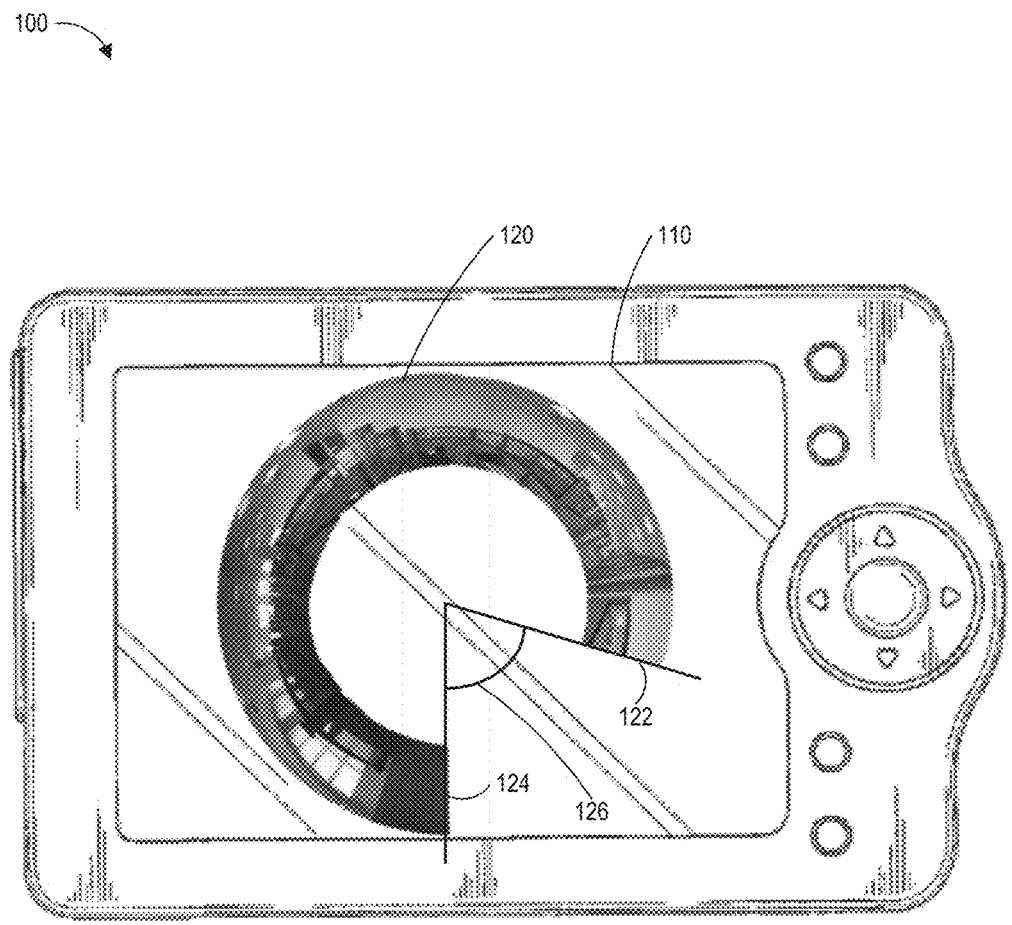
FIG. 1 illustrates an embodiment of an annular display of a panorama on an image capture device.

One embodiment relates to systems, methods and apparatus for capturing and displaying an annular representation of a panoramic image to a user. Often, image capture devices, such as digital cameras, will be integrated into a mobile computing device having an integrated display, such as a smartphone. Such displays, being relatively small, may not be able to fully display a panoramic image, except as a very small linear image on the display. Thus, some embodiments provide systems and methods for displaying a panoramic image as an annular representation of the image on a display. Particularly, some embodiments described herein relate to a panorama display device that displays an annular representation in which the arc of the annulus indicates a range of view covered by the panoramic image. For example, a complete annulus may indicate that the result of image stitching contains a complete 360 degree view, while an incomplete annulus may indicate that the stitching technique failed on a portion of the panorama or that image data was not provided for a portion of the panorama. In some embodiments, the annulus appears as a top-down view of the panoramic image. If the view was taken for an entire 360 degrees of image view, then the annulus would appear as a circle or wheel shaped image of the panoramic view taken by the user.

One skilled in the art will recognize that these embodiments may be implemented in hardware, software, firmware, or any combination thereof. Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

In the following description, specific details are given to provide a thorough understanding of the examples. However, it will be understood by one of ordinary skill in the art that the examples may be practiced without these specific details. For example, electrical components/devices may be shown in block diagrams in order not to obscure the examples in unnecessary detail. In other instances, such components, other structures and techniques may be shown in detail to further explain the examples.

It is also noted that the examples may be described as a process, which is depicted as a flowchart, a flow diagram, a finite state diagram, a structure diagram, or a block diagram. Although a flowchart may describe the operations as a sequential process, many of the operations can be performed in parallel, or concurrently, and the process can be repeated. In addition, the order of the operations may be re-arranged. A process is terminated when its operations are completed. A process may correspond to a method, a function, a procedure, a subroutine, a subprogram, etc. When a process corresponds to a software function, its termination corresponds to a return of the function to the calling function or the main function.

Referring now to FIG. 1, an exemplary annular panorama display will now be described in greater detail. As shown in FIG. 1, an image capture device 100 includes a display 110, and an annular panorama view 120 of a scene of interest. As shown, the view 120 is not completely circular, but instead has a first arc cutoff 122 and a second arc cutoff 124 which form a missing view angle 126. The missing view angle 126 is that portion of the panoramic image that was not captured by the user during image capture. As shown, the view 120 is scaled to fit within the parameters of the display 110 and gives the user a perspective of how the panoramic image looks, and also that a portion of the panoramic image, corresponding to the missing view angle 126, that was not properly captured.

Although the image capture device 100 shown is a digital camera, it will be understood by those skilled in the art that this is for purposes of illustration only and that the display 110 may be employed in a variety of image capture devices such as a video recorder, a web camera, a camera built into a portable or mobile computer, including but not limited to, a cellular telephone, smart phone, portable media player, personal digital assistant, a laptop, or a tablet computer. Image capture device 100 may be a digital camera, such as a digital video camera, a digital still image camera, or a combination of both. Image capture device 100 may be a stand-alone device, such as a stand-alone camera, or be integrated in another multi-purpose device, such as a wireless communication device. Image capture device 100 may also be equipped to capture color imagery, black-and-white imagery, or both. In this disclosure, the term "image," or similar terms may interchangeably refer to either video or still pictures. Further, display 110 may be employed on a display independent of an image capture device, such as an external desktop display of a computer system.

Display 110 may be used to display, for example, raw data of a target image scene as a preview, to display processed data of a target image scene as a preview for the captured image with processing applied, or to display captured images. The display 110 may also be used, in certain embodiments, to display the annular panorama view 120 to the user. The device 100 may also create a user interface on the display 110, for example by displaying a touch sensitive menu and thus allow a user to make selections regarding display of the panorama view 120. The on screen options may also allow a user to zoom in on a selected portion of the view 120, or to capture additional images to augment or complete the panorama. Thus, the touch screen is one means for selecting functions of the display of the panoramic image. Display 110 may be an LCD or LED screen, and may implement touch sensitive technologies, as discussed above.

In order to form the panoramic view 120, embodiments form a cylindrical projection of a view angle around a point at the center of the display. However, in some cases, the limitations of a two dimensional display can require transformation of the three dimensional cylinder into a two dimensional representation of the cylinder. To form the annular representation of the cylindrical projection of the panorama, the outer edge of the panorama in the annulus is slightly elongated relative to the inner edge. Such a circular representation is more compact than the typically used rectangular unwrapped image of the cylindrical projection, providing for viewing of more detail on a compact display.

Although the term "panorama" as used herein often refers to an image covering a 360 degree field of view of the entire area surrounding a point of view of an image capture device, the term encompasses some images that cover smaller fields of view. An image showing a field of view approximating, or greater than, that of the human eye—about 160° by 75°—may be termed panoramic.

For example, as shown in FIG. 1, a user may have captured images covering the full 360 degree field of view around the user but, due to misalignment of the images or an error in the image stitching process, a portion of the completed and cropped panorama may be missing. This portion is illustrated by missing view angle 126. In some embodiments, missing view angle 126 may correspond specifically to a determined view angle missing from the panorama. In other embodiments, the missing view angle 126 may be an approximation of the view angle missing from the panorama.

Other embodiments of the annular panorama view 120 may include an incomplete annulus merely to show that the edges of the panorama at first arc cutoff 122 and second arc cutoff 124 do not match, for example where a user has intentionally captured less than a full 360 degree view angle, and in such embodiments the missing view angle 126 may not correspond at all to the view angle actually required to create a full 360 degree panorama. In one embodiment, an image stitching algorithm may be used to stitch together sections of the captured panorama view. In this embodiment, as a result of the image stitching, the view angle covered by all of the image will be displayed. Moreover, on many mobile devices, such as cellular telephones or tablet computers, there are position sensors, such as inertial measurement unit (IMU) sensors that can determine the motion of the device as the images are being captured. This information can be used to determine the entire view angle of a captured panoramic image.

A panorama of a full 360 degree field of view may be displayed as a continuous annulus with no missing view angle 126 or first arc cutoff 122 and second arc cutoff 124. Although the annular panorama view 120 is displayed as an incomplete annulus with a missing range of view between first arc cutoff 122 and second arc cutoff 124, this merely an illustration of one embodiment of the annular panorama view 120, which may be displayed as a complete annulus or an incomplete annulus with a different missing range of view.

Figure 2:
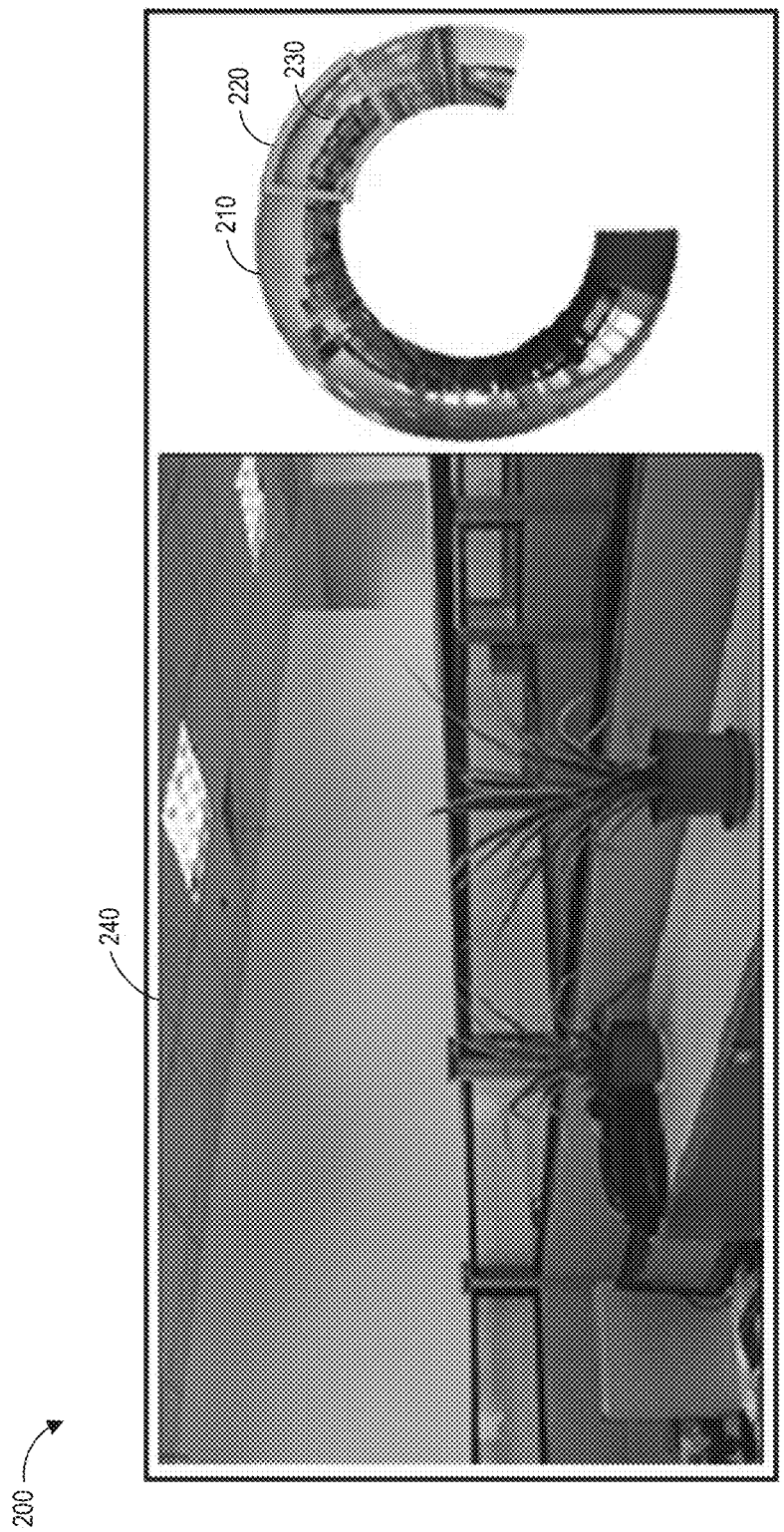
FIG. 2 illustrates an embodiment of an annular panorama display with a high resolution display.

FIG. 2 illustrates an embodiment of a display 200 of an annular panorama view 210 with an additional display area 240 for a high resolution image of a portion of the annulus. Display 200 may be implemented on a wide variety of devices, such as devices equipped with image capture technology and computing devices equipped with image display software. Display 200 includes a portion configured to display the annular panorama view 210 adjacent to a portion 240 for additional display of a higher resolution image that corresponds to a predetermined segment of the panoramic image. The configuration of these two display portions 210, 240 relative to one another may differ in embodiments other than the illustrated embodiment, as well as the size of each display.

A highlight window 220 is displayed over the annular panorama view 210, and the outlined portion of annular panorama 210 is displayed on the additional display area 240. This allows a user to select a portion 230 of the view 210 with window 220 and view a higher resolution display of that portion 230 of the panorama. In some embodiments, the window 220 may be slidable around the annular panorama view 210. This may be accomplished by a variety of window sliding means, such as a user rotating a wheel, pressing left and right buttons, or by moving the window around the view 210 with a finger on a touch sensitive display. Certain embodiments may allow the user to change the size of the window 220, such as by contracting or expanding the window 220. On a touch sensitive display, the user may change the size of the window 220 with a multi-touch gesture, such as a pinching motion to narrow the size of the window 220. Other embodiments may employ buttons, toggles, a wheel, or other selection means.

Additional display area 240 depicts a higher resolution version of the selected portion 230 of the annular panorama view 210. Display area 240 may be updated to correspond to a changing portion 230 as window 220 is moved around the annular view 210 or as window 220 is expanded or contracted. This allows the user to view the selected portion 230 at a much higher level of detail than is visible in the annular view 210. The user can also manipulate the higher resolution area 240, for example by sliding, or zooming in or zooming out on the image, and the window on annular panorama view 210 will change accordingly with the user's manipulations.

Figure 3:
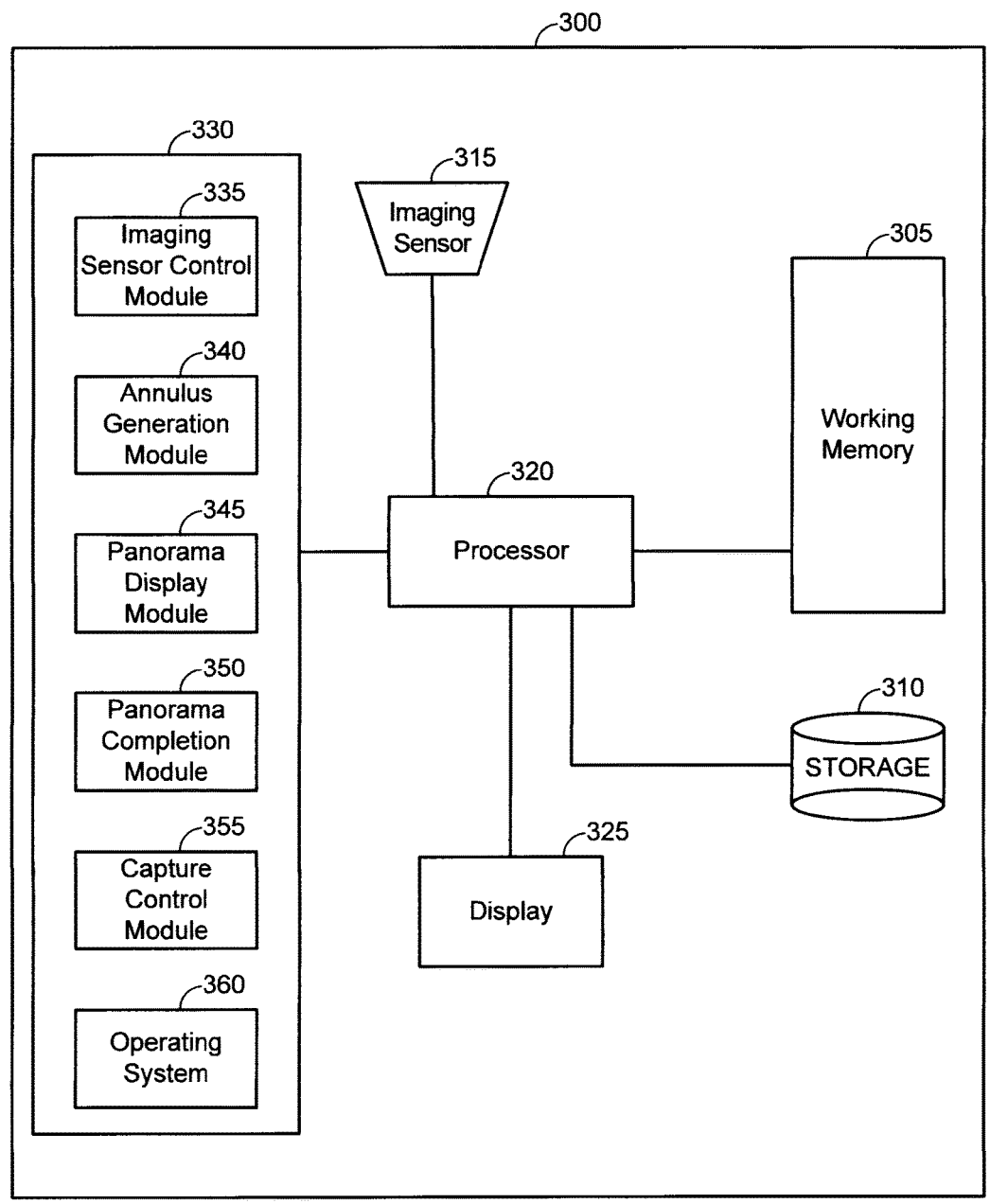
FIG. 3 illustrates an embodiment of a panoramic image capture and display system.

FIG. 3 depicts a high-level block diagram of an image capture device 300 configured for generation and display of an annular representation of a panorama, the device 300 having a set of components including a processor 320 linked to an imaging sensor 315. A working memory 305, storage 310, electronic display 325, and memory 330 are also in communication with the processor 320.

Device 300 may be a cell phone, digital camera, tablet computer, personal digital assistant, or the like. Device 300 may also be a more stationary device such as a desktop personal computer, video conferencing station, or the like that uses an internal or external camera for capturing images. Device 300 may also be a device equipped for processing digital images but not for image capture. For example, imaging sensor 315 may, in some embodiments, be separate from device 300, and may be replaced with a means for receiving or transmitting image data to device 300 of images captured by a separate device, such as by connection to an external memory. In such embodiments, device 300 may perform image stitching on the transmitted data as well as display of the resulting panorama, but not image capture. A plurality of applications may be available to the user on device 300. These applications may include traditional photographic applications as well as image stitching applications for producing panoramas.

The imaging sensor 315 can be, for example, a charge-coupled device (CCD), a complementary metal-oxide semiconductor (CMOS) sensor, or the like. The image sensor 315 may be coupled to the processor 320 to transmit a captured image to the image processor 320. The processor 320 may be configured to perform various image stitching techniques on received captured image in order to output a panoramic image, as will be described in more detail below.

Processor 320 may be a general purpose processing unit or a processor specially designed for imaging applications. As shown, the processor 220 is connected to a memory 330 and a working memory 305. In the illustrated embodiment, the memory 330 stores an imaging sensor control module 335, annulus generation module 340, panorama display module 345, panorama completion module 350, capture control module 355, and operating system 360. These modules may include instructions that configure the processor to perform various image processing and device management tasks. Working memory 305 may be used by processor 320 to store a working set of processor instructions contained in the modules of memory 330. Alternatively, working memory 305 may also be used by processor 320 to store dynamic data created during the operation of device 300.

As mentioned above, the processor 320 is configured by several modules stored in the memories. The imaging sensor control module 335 includes instructions that configure the processor 320 to adjust the focus position of imaging sensor 315. The imaging sensor control module 335 also includes instructions that configure the processor 320 to capture images with the imaging sensor 315. The instructions may include programming specific to capture of multiple images for panorama formation. Therefore, processor 320, along with image capture control module 335, imaging sensor 315, and working memory 305 represent one means for capturing an image using an imaging sensor.

Annulus generation module 340 includes instructions that configure the processor 320 to generate a panoramic image from a plurality of captured images with overlapping fields of view, and also includes instructions to form an annular representation of the panorama. Panorama generation may occur through known image stitching techniques. This may involve feature matching processes which search for image alignments that minimize the differences between overlapping pixels. Feature matching processes may include image stitching techniques to generate first edge data corresponding to at least a first portion of data representing a first image, to generate second edge data for at least a second portion of data representing a second image, and searching for regions within the edge data that contain similar pixel configurations. The first and second image may then be overlapped based on the similar pixel configurations. This may be repeated for all images taken for panorama formation, and the final stitched image may be cropped into the panorama. In some cases, data from an IMU in the image capture device can be combined with this process to improve the process of producing a panoramic image.

After generating the panorama, annulus generation module 340 may configure the processor 320 to generate an annular representation of the panorama. This may include instructions to compare the left and right edges of the panorama for matching features in order to determine whether the panorama covers a full 360 degree view angle or is a wide angle image of less than 360 degrees. An annular representation of a full 360 degree panorama may be displayed as a full annulus. If the panorama covers less than a 360 degree view, annulus generation module 340 may display the panorama as an incomplete annulus having a missing portion between two arc edges. The missing portion may cover an angle similar to the missing view angle, or may merely represent that some view angle less than 360 degrees is covered by the panorama.

Panorama display module 345 configures the processor 220 to handle display of the annular panoramic view generated by annulus generation module 340, as well as a changing display of a higher resolution portion of the annulus as will be explained more completely below with respect to display 325. Certain embodiments of the device 300 may also operate in a menu mode or image capture mode, wherein the panorama display module 345 would configure display 325 to not display any panorama to the user. For example, when the device 300 is in an image capture mode, panorama display module 345 may turn over control of the processor to capture control module 355, which includes instructions to display an image capture user interface on display 325.

Panorama completion module 350 may configure the processor 320 to present a panorama completion user interface on display 325 and to assist a user in capturing further images of the panoramic scene. If a panorama is determined to cover less than a full 360 view angle, panorama completion module 350 may prompt the user to see whether the user desires to capture additional image data to complete the panorama. To assist the user in capturing further images, the panorama completion module may display edge data of the panorama on display 325 to assist the user in aligning the additional images with the partial panorama. Panorama completion module may then employ image stitching techniques to merge the additional image data with the panorama image data.

Capture control module 355 may include instructions that control the overall image capture functions of the device 300. For example, capture control module 355 may include instructions that call subroutines to configure the processor 320 to use instructions from imaging sensor control module 335 to capture raw image data of a target image scene using the imaging sensor 315, or to capture a plurality of images of a panoramic view. Capture control module 355 may then call the annulus generation module 340 to employ image stitching techniques on the captured images to generate a panorama and an annular view of the panorama. Capture control module 355 may then call panorama display module 345 to display the panorama to a user. If the panorama represents less than a full 360 view angle, capture control module 355 may call panorama completion module 350 to assist the user in capturing additional image data.

Operating System module 360 configures the processor 320 to manage the memory and processing resources of the device 300. For example, the operating system module 360 may include device drivers to manage hardware resources such as the electronic display 325, storage 310, or imaging sensor 315. Therefore, in some embodiments, instructions contained in the image processing modules discussed above may not interact with these hardware resources directly, but instead interact through standard subroutines or APIs located in operating system component 370. Instructions within operating system 370 may then interact directly with these hardware components.

The processor 320 may be further configured to control the display 325 to display a panorama to a user. Some embodiments of the display may include a portion for displaying a high resolution of a portion of the panorama. The display 325 may be external to the imaging device 300 or may be part of the imaging device 300. The display 325 may also be configured to provide a view finder for a user prior to capturing an image, or may be configured to display a captured image stored in memory or recently captured by the user. The display 325 may comprise an LCD or LED screen, and may implement touch sensitive technologies.

Processor 320 may write data to storage 310, for example data representing captured images, stitched panoramas, and panorama view images. While storage 310 is represented graphically as a traditional disk device, those with skill in the art would understand that the storage 310 may be configured as any storage media device. For example, the storage 310 may include a disk drive, such as a hard disk drive, optical disk drive or magneto-optical disk drive, or a solid state memory such as a FLASH memory, RAM, ROM, and/or EEPROM. The storage 310 can also include multiple memory units, and any one of the memory units may be configured to be within the image capture device 300, or may be external to the image capture device 300. For example, the storage module 310 may include a ROM memory containing system program instructions stored within the image capture device 300. The storage module 310 may also include memory cards or high speed memories configured to store captured images which may be removable from the camera.

Although FIG. 3 depicts a device comprising separate components to include a processor, imaging sensor, and memory, one skilled in the art would recognize that these separate components may be combined in a variety of ways to achieve particular design objectives. For example, in an alternative embodiment, the memory components may be combined with processor components to save cost and improve performance.

Additionally, although FIG. 3 illustrates two memory components, to include memory component 330 comprising several modules, and a separate memory 305 comprising a working memory, one with skill in the art would recognize several embodiments utilizing different memory architectures. For example, a design may utilize ROM or static RAM memory for the storage of processor instructions implementing the modules contained in memory 330. Alternatively, processor instructions may be read at system startup from a disk storage device that is integrated into device 300 or connected via an external device port. The processor instructions may then be loaded into RAM to facilitate execution by the processor. For example, working memory 305 may be a RAM memory, with instructions loaded into working memory 305 before execution by the processor 320.

Figure 4:
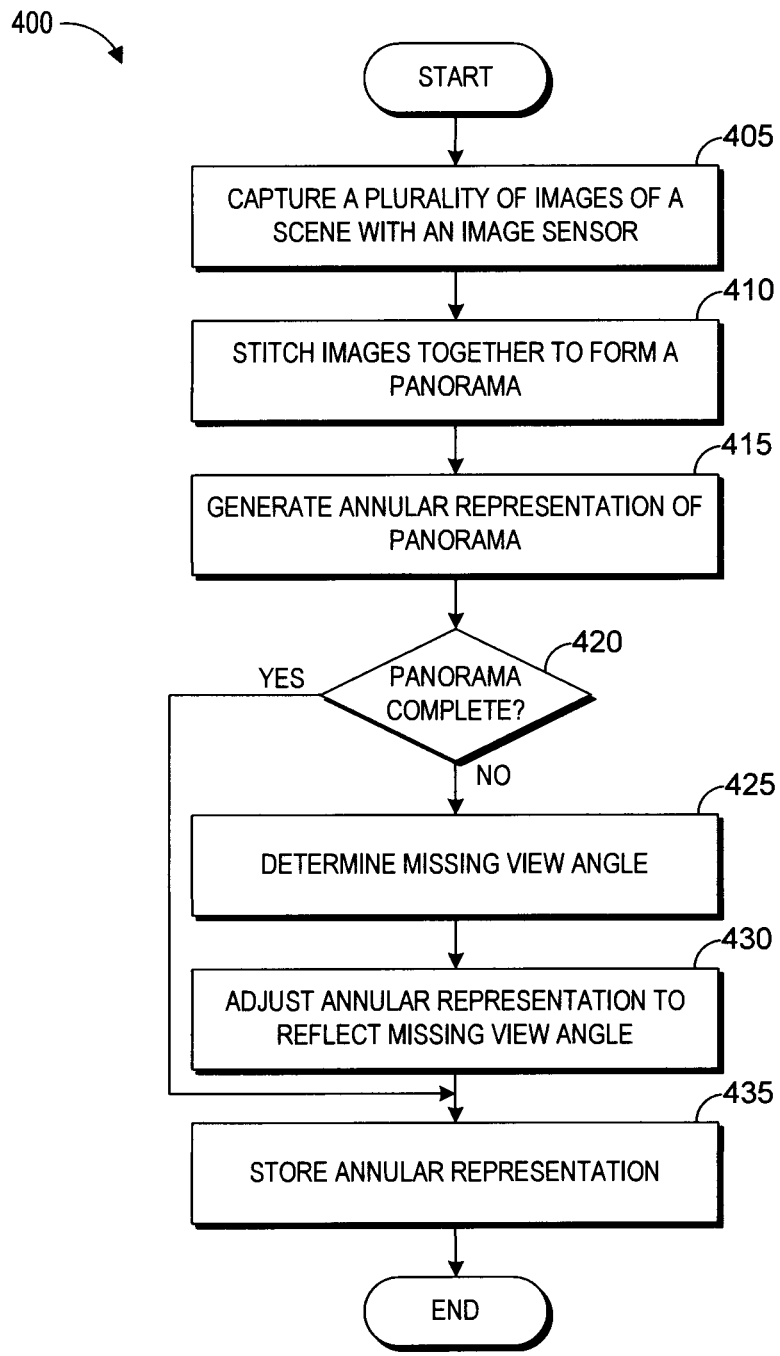
FIG. 4 illustrates an embodiment of a process for generating annular panoramic images.

A panorama annular representation generation process 400 will now be described with greater detail with respect to FIG. 4. This process may be carried out by annulus generation module 340 of FIG. 3. The process 400 begins at block 405 where an image capture device captures a plurality of images of a scene. For quality panorama generation it is desirable to have the multiple images that make up the panoramic view contain a certain amount of overlap and have been taken at similar exposures. Accordingly, the image capture process can be aided by the use of particular user interfaces that assist the user in capturing panoramic images.

After capturing a plurality of images at block 405, the process 400 moves to block 410, wherein the plurality of images are combined to produce the panorama using image stitching techniques. Some embodiments of image stitching techniques may employ feature matching methods to search for patches of similar pixel data within each captured image to determine how to overlap the edges of the individual images of the panorama. The images may also be calibrated to minimize differences between adjacent images due to lens distortion, exposure differences, vignetting (change in the image's brightness or saturation at the periphery relative to the image center), or color aberrations. Image stitching techniques may also use blending techniques to minimize seam lines between the individual images as well as apply processing filters to enhance the appearance of the panorama.

The process 400 then moves to block 415 wherein an annular representation of the panorama is generated. The process then moves to a decision block 420 to determine whether the panorama represents a complete 360 degree view angle and is complete. This may be accomplished by techniques similar to those discussed above with respect to image stitching at block 410 wherein edge features are analyzed for similar pixel data. If there are matching features between the left and right edge of the panorama, the process 400 may perform image stitching to create a seamless annular representation of the panorama. Other embodiments may simply adjoin the left and right panorama edges to form the annulus, which may leave a noticeable seam in the annulus.

If a decision is made at the decision block 420 that there are no matching features on the left and right edge of the panorama, the process 400 moves to block 425 where the missing view angle is determined. Where a user has captured image data covering an entire 360 field of view, but the complete panorama fails to include the entire field due to imperfections in image stitching, it may be possible to determine a specific view angle missing from the panorama. The process 400 then moves to a block 430 wherein the annular panorama representation is adjusted to reflect the missing view angle. In one, embodiment, the annular representation is adjusted by creating an empty segment of the annulus corresponding to the missing view angle. If it is not possible to determine or approximate a missing view angle, for example where a user has intentionally captured image data of less than a 360 view angle, the process 400 at block 430 may adjust the annulus view to include an empty segment of a predetermined size to indicate a wide angle view of less than 360 degrees.

If the incompleteness of image gathering is caused by the failure of stitching, the annular image will have a missing view angle 126, showing which part of the image is not included. If the incompleteness of the image was purposeful by the user during image capture, then the view angle may be estimated by the system and the annular image can show a relatively large arc, e.g. 180 degree. In some embodiments, the user can manually change the degree of the missing arc by taking additional images, or deleting image information. Thus, a particular annular representation manipulated by a user can give the user better image resolution. Additionally, the modified annular image can be distinguished by highlighting the edge or the entire boundary as it's displayed to the user.

The process 400 then moves to block 435 where the annular representation is stored in a memory storage.

Figure 5:
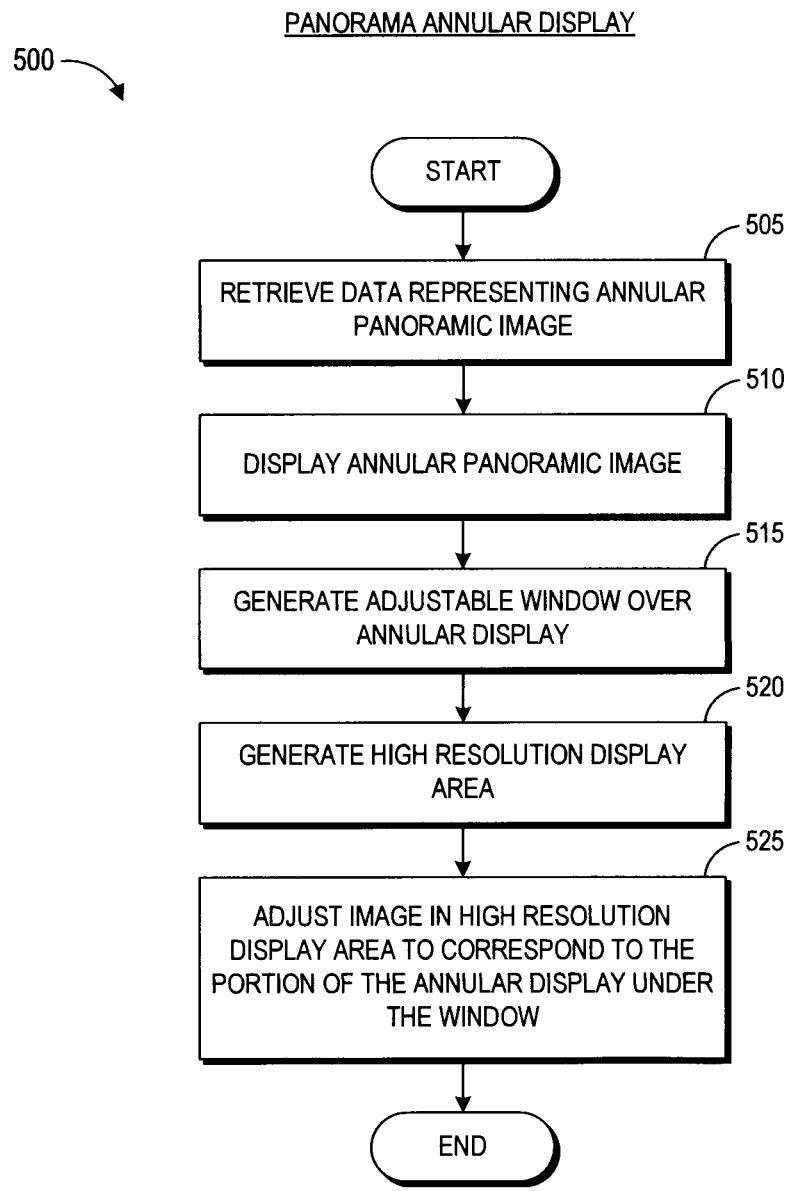
FIG. 5 illustrates an embodiment of a panorama display process.

FIG. 5 is a flow chart illustrating a panorama annular display process 500 that runs within one embodiment of the panorama display module 345 and may employ display 325 of FIG. 3. The process 500 begins at block 505 where data representing an annular panorama, such as may be generated by the process 400 of FIG. 4, is retrieved. The process 500 then moves to step 510 wherein the annular panoramic image is displayed to a user.

The process 500 then moves to block 515, wherein an adjustable window may be generated over the annular panoramic image. This window may allow a user to select a portion of the annular view, and may enable the user to view a higher resolution display of that portion. In some embodiments, the window may be slidable around the annular panorama view. As discussed above, movement of the window may be accomplished by a variety of means. Where the display comprises a separate display screen and user interface, the user may move the window by rotating a wheel, pressing left and right buttons, or using a toggle. In embodiments which comprise a touch sensitive display, the user may move the window around the view with a finger. Certain embodiments may allow the user to contract or expand the size of the window. On a touch sensitive display, the user may be able to change the size of the window with a multitouch gesture such as a pinching motion to narrow the size of the window or a spreading motion to expand the size of the window. Other embodiments not equipped with touch sensitive technology may employ buttons, toggles, a wheel, or other means for enabling a user to adjust the window size.

The process 500 then transitions to block 520 and generates an additional display area for displaying a higher resolution version of a portion of the annular panorama view. After the high resolution display is generated at block 520, the process 500 then moves to block 525 and updates the high resolution display area to correspond to a changing portion of the panorama selected by the window generated in step 515. For example, as the window is moved around the annular view, is expanded, or is contracted, the process 500 updates the high resolution display area to display the portion of the annular view currently bound by the window. This additional high resolution display area allows the user to view a selected portion of the panorama at a much higher level of detail than is visible in the annular view. It should also be realized that it is possible to use a touchscreen on the image capture device to slide, or zoom-in/zoom-out on the higher resolution image, wherein the sliding window on annulus will move or stretch according to the user's movement on the touchscreen.

Figure 6:
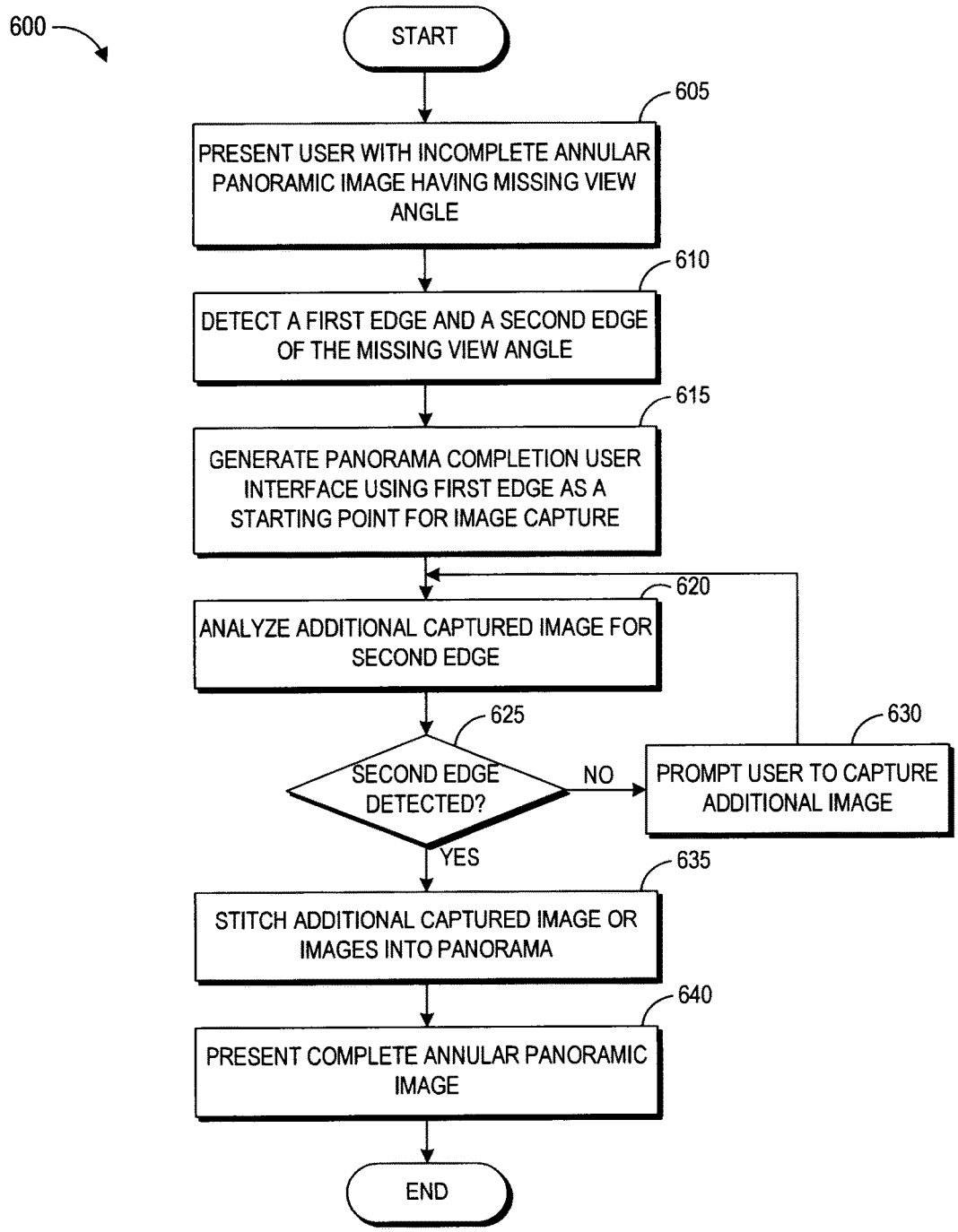
FIG. 6 illustrates one embodiment of a process to complete an incomplete panoramic image with the guidance of an annular display.

FIG. 6 represents an embodiment of panorama completion process 600. The process 600 may be implemented by instructions contained in panorama completion module 350 of device 300, illustrated in FIG. 3. Process 600 begins at step 605 when the user is presented with an incomplete annular panoramic image having a missing view angle. The user may select an option to capture additional image data to complete the panorama.

After presenting the user with the incomplete annular view, to assist the user in capturing additional image data which would be useful in completing the panorama, the process 600 moves to block 610 and detects a first and second edge of the view angle missing from the panorama. This may correspond to the arc boundary of the incomplete annulus, such as arc edges 122 and 124 depicted in the incomplete annulus of FIG. 1. This step also may include an approximation of the missing view angle and a computation of the number of additional images required to complete the panorama.

The process 600 then moves to step 615 and generates a panorama completion user interface using a first edge as a starting point for capture of additional image data. In some embodiments, the first edge, such as arc edge 122, may be displayed to the user on the image capture interface to assist the user in capturing an image which overlaps with the panorama. After generating the interface, the process 600 transitions to step 620 and analyzes the additional captured image to determine whether the second edge, such as arc edge 124, is detected within the additional image. This moves the process 600 to decision block 625, at which the process 600 determines whether the second edge was detected. If it was not, the process 600 moves to step 630 where the user is prompted to capture additional image data, after which the process 600 loops to block 620. When the second edge is detected, the process 600 transitions to block 635 where the additional captured image data is stitched into the panorama. The process 600 then moves to block 640 wherein the complete annular panoramic image may then be presented to the user.

The technology is operational with numerous other general purpose or special purpose computing system environments or configurations. Examples of well-known computing systems, environments, and/or configurations that may be suitable for use with the invention include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system may be used in connection with various operating systems such as Linux®, UNIX® or Microsoft Windows®.

The system may be written in any conventional programming language such as C, C++, BASIC, Pascal, or Java, and ran under a conventional operating system. C, C++, BASIC, Pascal, Java, and FORTRAN are industry standard programming languages for which many commercial compilers can be used to create executable code. The system may also be written using interpreted languages such as Perl, Python or Ruby.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the invention should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

What is claimed is:
1. A system for displaying panoramic images comprising:
an image sensor configured to capture a panoramic image of a scene of interest;
a processor configured to:
read the captured panoramic image,
identify a missing portion of the panoramic image,
form an annular configuration of the panoramic image, wherein the annular configuration comprises an incomplete annulus including an arc representing a range of view covered by the panoramic image, the arc including a first arc cutoff edge and a second arc cutoff edge bounding a missing view angle representing the missing portion of the panoramic image,
receive selection by a user of an option to capture additional image data representing the missing portion of the panoramic image,
detect first and second edges of the missing portion of the panoramic view, the first and second edges corresponding to the first arc cutoff edge and the second arc cutoff edge, respectively,
generate a panorama completion user interface using the first edge,
receive the additional image data representing the missing portion of the panoramic image,
stitch the additional image data representing the missing portion into the panoramic image, update the annular configuration based on the stitching to include a complete annulus of the panoramic image, and output the complete annulus to a display; and the display configured to display the annular configuration of the panoramic image.

2. The system of claim 1, wherein the processor is further configured to output to the display:

a window configured to bound a portion of the arc of the annular configuration; and a high resolution display portion configured to display a rectangular image, wherein the rectangular image corresponds to the portion of the arc of the annular configuration.

3. The system of claim 2, wherein the window is movable around the arc of the annular configuration.

4. The system of claim 2, wherein a size of the window or the high resolution display portion is adjustable.

5. The system of claim 3, wherein the rectangular image is updated to correspond to the portion of the arc of the annular configuration bound by the window.

6. The system of claim 1, wherein the display comprises a touch screen, an LCD screen, or an LED screen.

7. A method for generating a panoramic image of a scene, the method comprising:

receiving image data representing a plurality of images of a scene of interest from an image sensor;

combining the plurality of images into a panoramic view of the scene of interest;

identifying a missing portion of the panoramic view;

generating an annular graphical representation of the panoramic view, wherein the annular graphical representation comprises an incomplete annulus including an arc representing a range of view covered by the panoramic image, the arc including a first arc cutoff edge and a second arc cutoff edge bounding a missing view angle representing the missing portion of the panoramic view;

displaying the annular graphical representation on a display;

receiving selection by a user of an option to capture additional image data representing the missing portion of the panoramic view;

detecting first and second edges of the missing portion of the panoramic view, the first and second edges corresponding to the first arc cutoff edge and the second arc cutoff edge, respectively;

generating a panorama completion user interface using the first edge receiving the additional image data representing the missing portion of the panoramic view;

combining the additional image data representing the missing portion with the panoramic view;

updating the annular graphical representation based on the combining to include a complete annulus of the panoramic view; and displaying the complete annulus of the panoramic image.

8. The method of claim 7, wherein displaying the annular graphical representation further comprises:

displaying a window over a portion of the arc of the annular graphical representation; and displaying a high-resolution rectangular image corresponding to the portion of the arc of the annular graphical representation.

9. The method of claim 8, further comprising updating the high-resolution rectangular image or the window as a user moves the window around the arc of the annular graphical representation.

10. The method of claim 8, further comprising updating the high-resolution rectangular image as a user adjusts a size of the window.

11. A non-transitory computer-readable medium comprising code that, when executed, causes an processor to perform the method of:

receiving image data representing a plurality of images;

combining the plurality of images into a panoramic image;

identifying a missing portion of the panoramic image;

generating an annular graphical representation of the panoramic view, wherein the annular graphical representation comprises an incomplete annulus including an arc representing a range of view covered by the panoramic image, the arc including a first arc cutoff edge and a second arc cutoff edge bounding a missing view angle representing the missing portion of the panoramic image;

displaying the annular graphical representation to a user on a display;

receiving selection by a user of an option to capture additional image data representing the missing portion of the panoramic image;

detecting first and second edges of the missing portion of the panoramic view, the first and second edges corresponding to the first arc cutoff edge and the second arc cutoff edge, respectively;

generating a panorama completion user interface using the first edge;

receiving the additional image data representing the missing portion of the panoramic image;

stitching the additional image data representing the missing portion into the panoramic image;

updating the annular graphical representation based on the stitching to include a complete annulus of the panoramic image; and displaying the complete annulus of the panoramic image.

12. The non-transitory computer-readable medium of claim 11, wherein displaying the annular graphical representation further comprises:

displaying a window over a portion of the arc of the annular graphical representation; and displaying a high-resolution rectangular image corresponding to the portion of the arc of the annular graphical representation.

13. The non-transitory computer-readable medium of claim 12, further comprising updating the high-resolution rectangular image as a user moves the window around the arc of the annular graphical representation.

14. The non-transitory computer-readable medium of claim 12, the method further comprising updating the high-resolution rectangular image as a user adjusts a size of the window.

15. An apparatus for generating and displaying panoramic images comprising:

means for capturing a plurality of images;

means for:

combining the plurality of images into a panoramic image, identifying a missing portion of the panoramic image, generating an annular graphical representation of the panoramic view, wherein the annular graphical representation comprises an incomplete annulus including an arc representing a range of view covered by the panoramic image, the arc including a first arc cutoff edge and a second arc cutoff edge bounding a missing view angle representing the missing portion of the panoramic image; and means for displaying the panorama as an annular view,
 receiving selection by a user of an option to capture additional image data representing the missing portion of the panoramic image,
 detecting first and second edges of the missing portion of the panoramic view, the first and second edges corresponding to the first arc cutoff edge and the second arc cutoff edge, respectively;
 generating a panorama completion user interface using the first edge;
 receiving the additional image data representing the missing portion of the panoramic image;
 stitching the additional image data representing the missing portion into the panoramic image;
 updating the annular graphical representation based on the stitching to include a complete annulus of the panoramic image; and
 displaying the complete annulus of the panoramic image.

16. The apparatus of claim 15, wherein the means for capturing a plurality of images comprises a digital imaging device.

17. The apparatus of claim 16, wherein the digital imaging device is incorporated into a mobile computing device.

18. The apparatus of claim 15, further comprising means for assisting a user in capturing an image or images to fill in the missing portion of the panoramic image.

19. The apparatus of claim 15, wherein the means for displaying the panorama comprises touch screen technology or a flat panel display.

* * * * *